(12) United States Patent
Haartsen

(10) Patent No.: US 6,850,740 B1
(45) Date of Patent: Feb. 1, 2005

(54) TIME AND FREQUENCY DIVERSITY IN FH/TDD SYSTEMS

(75) Inventor: Jacobus C. Haartsen, Hardenberg (NL)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/425,970

(22) Filed: Oct. 25, 1999

Related U.S. Application Data

(60) Provisional application No. 60/134,538, filed on May 17, 1999.

(51) Int. Cl.[7] .............................. H04Q 7/00; H04B 7/02
(52) U.S. Cl. ....................... 455/101; 370/330; 370/343; 375/347
(58) Field of Search ................................. 370/330, 343, 370/344, 345, 347, 348, 280, 281, 294, 295; 455/101; 375/347

(56) References Cited

U.S. PATENT DOCUMENTS

| | | | |
|---|---|---|---|
| 4,616,364 A | | 10/1986 | Lee ................................ 375/1 |
| 5,390,166 A | * | 2/1995 | Rohani et al. |
| 5,436,906 A | * | 7/1995 | Kasuya et al. |
| 5,663,957 A | * | 9/1997 | Dent |
| 5,870,391 A | * | 2/1999 | Nago |
| 5,978,366 A | * | 11/1999 | Massingill et al. |

FOREIGN PATENT DOCUMENTS

WO 99/14885 3/1999

OTHER PUBLICATIONS

"Digital Communications, Fundamentals and Applications" Bernard Sklar; 1988; Prentice Hall; pp. 550, et seq.
XP 000690097—Adaptive Time Diversity for TDMA/TDD Personal Communication Systems, Yasushi Kondo et al., NTT Wireless Systems Laboratories, vol. 4, Nov. 6, 1995, pp. 973–976.

* cited by examiner

Primary Examiner—David Hudspeth
Assistant Examiner—Huy Nguyen
(74) Attorney, Agent, or Firm—Potomac Patent Group PLLC

(57) ABSTRACT

A method and apparatus for radio communications which uses frequency and time diversity oriented spread spectrum modulation includes adding an additional link depending on interference characteristics. A plurality of data packets may be communicated from a transmitter to a receiver where a first radio link is established by reserving a series of time slots. The radio link, for example, may be one out of every n time slots, where n>1. A second radio link may further be established on a different one out of every n time slots such that each of the plurality of data packets is transmitted over both the first and second radio links resulting in diversity such that the receiver receives each of the data packets twice. Each radio link uses a frequency hopping channel and for each data packet, transmission over the first link occurs on a different frequency than is used for transmission over the second link. The second link may be established in response to detection by the receiver of reception quality problems associated with the first link. Accordingly, the second link may be terminated in response to detection by the receiver of an absence of reception quality problems associated with the first link.

15 Claims, 9 Drawing Sheets

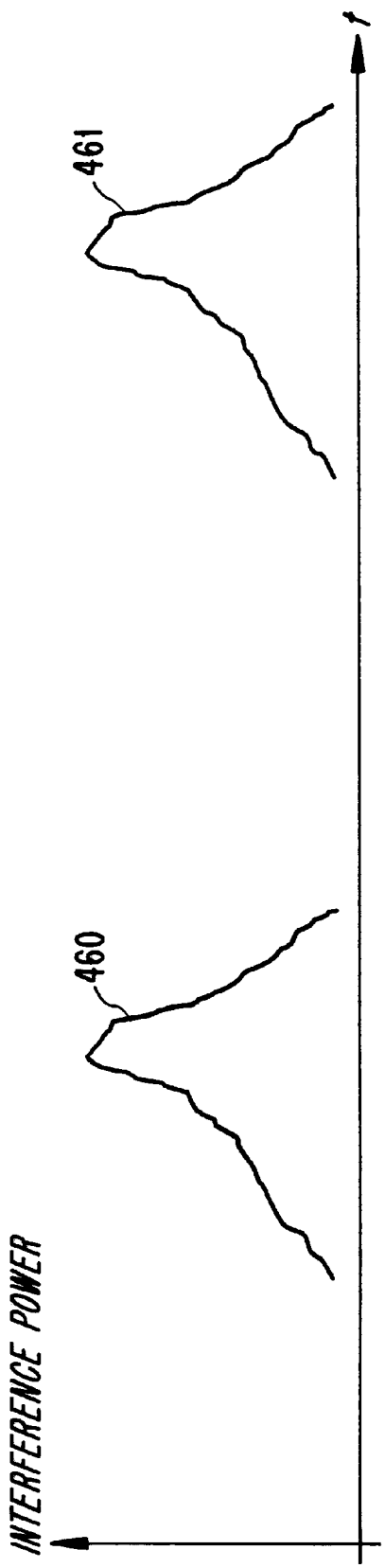

TIME AND FREQUENCY DIVERSITY IN FH/TDD SYSTEMS

This application claims domestic priority from Provisional Application Serial No. 60/134,538, filed on May 17, 1999.

BACKGROUND

The present invention relates to radio systems, and more particularly to a method and apparatus for applying frequency hopping (FH) spread spectrum, in radiocommunication systems operating in the presence of interference.

In recent decades, progress in radio and VLSI technology has fostered widespread use of radio communications in consumer applications. Portable devices, such as mobile radios, can now be produced having acceptable cost, size and power consumption.

Although radio communications technology today is focused mainly on voice communications, for example, handheld radios, cellular phones and the like, likely expansion in the near future promises to provide greater information flow to and from other types of nomadic devices such as mobile fax and mobile Internet browsers, and fixed devices such as computers and base stations. More specifically, it is likely that further advances in radio communications technology will provide very inexpensive radio equipment, which can be easily integrated into many kinds of devices. Advances in radio communications promises to reduce the need for cable-based services that are currently in favor. For example, master devices may communicate with respective peripherals over wireless links, thus eliminating the need for cables.

To accommodate the rapid expansion of radio communications services extensive bandwidth is required. An unlicensed band with sufficient capacity to allow for high data rate transmissions would be desirable. A suitable band for such an endeavor may be found in the ISM (Industrial, Scientific and Medical) band at 2.45 GHz, which is globally available. The band provides 83.5 MHZ of radio spectrum roughly centered at 2.45 GHz.

To allow different radio networks to share the same radio medium without coordination, signal spreading is usually applied. In fact, the United States Federal Communications Commission (FCC) presently requires commercial radio equipment operating in the 2.45 GHz band to apply some form of spreading when the transmit power exceeds about 0 dBm. Spreading can either be at the symbol level by applying direct-sequence (DS) spread spectrum or at the channel level by applying frequency hopping (FH) spread spectrum. The latter is attractive for the radio applications mentioned above since it more readily allows the use of cost-effective radios.

Spread spectrum using DS spreading involves modulating a carrier waveform with a data signal x(t). The data modulated carrier is then modulated further with a wideband spreading signal g(t) and transmitted. To decode the transmission a synchronized replica of the spreading signal g(t-Td), where Td is a receiver estimate of propagation delay, is remodulated with the received signal and, if properly synchronized (e.g., if the estimate Td is correct), a despread signal can be demodulated and recovered. In FH systems using M-ary Frequency Shift Keying (MFSK), $k=\log_2 M$ information bits are used to determine which one of M frequencies are to be transmitted for each "hop". MFSK is a commonly used modulation method to achieve spreading. For more detailed information regarding direct sequence and frequency hopping spread spectrum, see Digital Communications, Fundamentals and Applications, Bernard Sklar, 1988, Prentice Hall, pp 550, et. seq.

Both spreading methods have their merits and drawbacks. Direct sequence (DS) spread spectrum, for example, has been able to deliver high, per channel raw data rates, but may be limited in the number of overlapping cells that can be supported before a DS system begins to interfere with itself. Frequency hopping spread spectrum, conversely, does not suffer to the same degree from the self-blocking tendency of DS. Frequency hopping systems may support substantially more overlapping cells before system performance begins to degrade. However, the raw data rates delivered by FH systems have, historically, been substantially below that of DS. On balance however, given the present state-of-the-art, FH spreading results in less complex and cheaper radio transceivers than DS spreading.

The 2.45 Ghz ISM band is presently available for any system fulfilling the part 15 rules as required by the FCC. In Europe and Asia, similar rules are set by communications authorities. Systems operating in the ISM band therefore must deal effectively with a variety of sources of unknown and unpredictable interference due to the wide array of different systems which may transmit freely in the ISM band. Ironically, the most significant interference sources at present in the 2.45 GHz ISM band are not communication devices but are microwave ovens.

Microwave ovens presently operate in a band ranging from about 2.44 GHZ to 2.48 GHZ and must abide by separate FCC rules, namely FCC part 18, which rules are less stringent than those found within FCC part 15. FCC part 18, allows for higher signal powers and broader signal spectra thus increasing the likelihood of interference between, for example, microwave ovens and radio communication devices. Moreover, the interference from microwave ovens is relatively unpredictable compared to other interference sources and may depend on the make of the oven, the type of food being heated, and the like. Nevertheless, because of the nature of interferers like microwave ovens which may be present across the frequency spectrum special problems may arise which call for special solutions not readily found in prior art systems.

One such system is disclosed in U.S. Pat. No. 5,436,906 issued to Kasuya et al (hereinafter "Kasuya"). Kasuya discloses a radio telecommunication system which uses a non designated time slot when signal quality decreases below a quality criterion for a signal in a first time slot.

U.S. Pat. No. 5,436,906 to KASUYA et al. describes a TDMA communications protocol between a base-station and a mobile terminal. If one of the receivers (either in the base-station or in the mobile terminal) detects a higher bit error rate (BER) than a predetermined threshold a process will be initiated to use more than one time-slot. The system first checks if there are unused time-slots. If this is the case one or more additional time-slots will be allocated. Information is then sent on two or more time-slots. The receiver can then compare the BER of the different time-slots and use the one with the lowest BER. The extra time-slots can later be released if signal quality improves.

U.S. Pat. No. 5,663,957 to DENT describes a TDMA system which utilizes two time-slots when needed in order to maintain good received signal quality. See especially claims 1, 5 and 6. document 2 also mentions FH and TDD. See especially column 23, row 37 to column 24, row 23 and column, 3, rows 50 to 56.

U.S. Pat. No. 5,390,166 to ROHANI et al. describes a communication system operating according to frequency hopping code division multiple access (FH-CDMA). The receiver receives several time slots and either combines them or selects the best slot to produce an output signal.

U.S. Pat. No. 4,616,364 to LEE describes a digital hopped frequency, time diversity system that transmits a piece of information on different frequencies. The receiver selects the best signal.

While the above mentioned systems address certain issue and problems primarily in TDMA type systems, none address the impact of a time and/or frequency varying interferer on an FH channel. It would therefore be appreciated in the art for a method and apparatus for reducing the impact of an interferer on a FH communication channel.

SUMMARY

To reduce the impact of an interferer, particularly a band-limited time-varying interferer, a method and apparatus for FH/TDD systems is disclosed.

It is therefore an object of the present invention to provide a method and apparatus capable of reducing the impact of time-varying interference from unpredictable sources on a radio communication system.

In accordance with one aspect of the present invention, the foregoing and other objects are achieved in a method and apparatus for radio communications which uses frequency and time diversity oriented spread spectrum modulation and may add an additional link depending on interference characteristics.

A plurality of data packets may be communicated from a transmitter, to a receiver in a radio communication system where a first radio link is established between the transmitter and the receiver by reserving a series of time slots. The radio link, for example, may be one out of every n time slots, where n>1. A second radio link may further be established between the transmitter and the receiver on a different one out of every n time slots such that each of the plurality of data packets is transmitted over both the first and second radio links resulting in time and frequency diversity such that the receiver receives each of the data packets twice.

In accordance with another aspect of the present invention, the second radio link may be established at an offset m, measured generally with respect to number of time slots, from the first radio link. The offset m may be variable and can be greater or less than the number n as described herein above.

In accordance with still another aspect of the present invention, each of the first and second radio links utilizes a frequency hopping channel and for each of the plurality of data packets, transmission over the first radio link occurs using a different frequency hop sequence than is used for transmission over the second radio link.

In accordance with still another aspect of the present invention, further time and frequency diversity may be achieved in that the plurality of data plackets associated with one of the first and second radio links may be delayed with respect to another of the first and second radio links such that each of the plurality of data packets associated with the first and the second radio links are desynchronized by adding a delay at some point prior to transmission of the plurality of data packets. The delay may be compensated for in a receiver such that each of the plurality of data packets are re-synchronized.

In accordance with still another aspect of the present invention, transmission for each of the plurality of data packets may occur using a different hop frequency for the first radio link than for the second radio link to further assure frequency diversity between data packets transmitted on the first and second radio links.

Providing diversity improves reception in a radio communication system exposed to interference, thus in accordance with yet another aspect of the present invention, the second radio link may be established in response to detection by the receiver of reception quality problems associated with the first radio link. Accordingly, the second radio link may be terminated in response to detection by the receiver of an absence of reception quality problems associated with the first radio link.

BRIEF DESCRIPTION OF THE DRAWINGS

The objects and advantages of the invention will be understood by reading the following detailed description in conjunction with the drawings, in which:

FIG. 4B is a graph illustrating signal power of an exemplary time-varying interferer.

DETAILED DESCRIPTION

Figure 1:
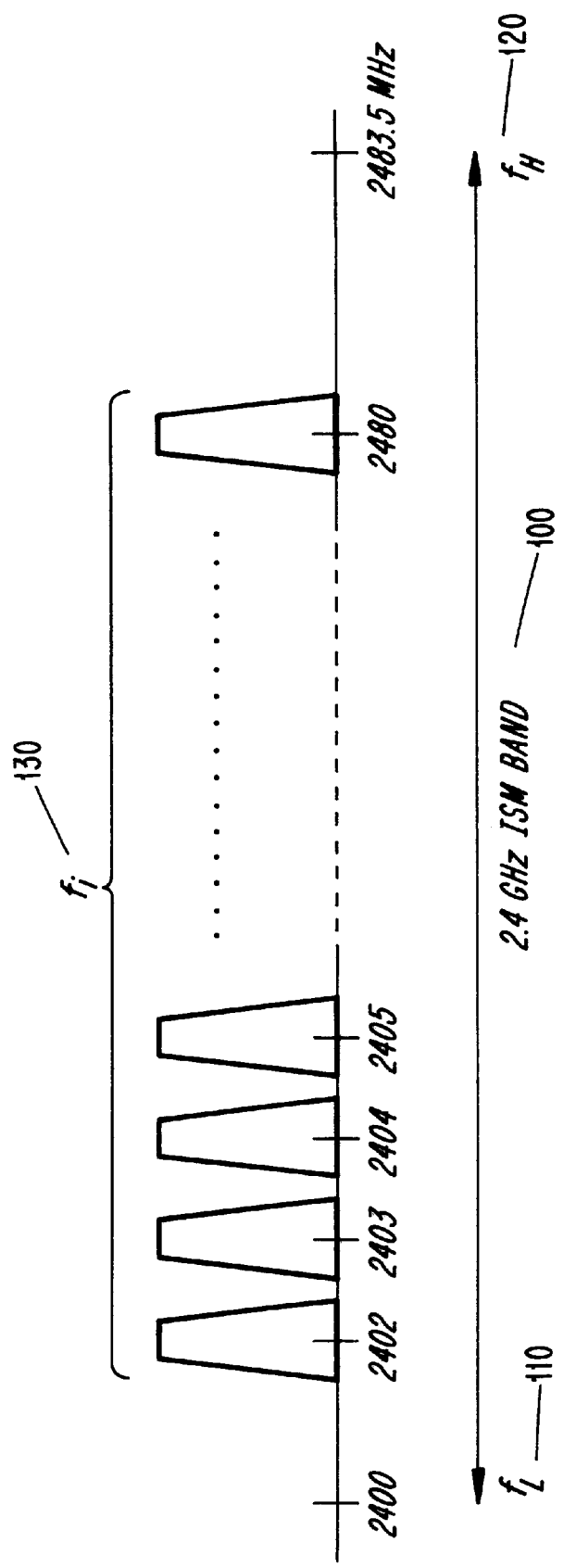
FIG. 1 is a diagram illustrating exemplary carrier allocation in the 2.45 GHz ISM band.

The various features of the invention will now be described with reference to the figures, in which like parts are identified with the same reference characters.

Since the ISM band at 2.45 GHz has been opened for commercial applications, many products have been introduced providing wireless communications in these bands. The usage of the band is restricted in the US by the Part 15 rules of the FCC and in Europe by the ETS 300 328 of the ETSI. In other countries throughout the world, similar rules may apply. In short, as previously described, the rules require systems operating in the ISM band to spread their transmit signal power over the band in order to spread the interference they produce and to increase interference immunity at the receiver. Spreading may be obtained either by FH spreading or DS spreading.

Thus, generally, the FH system of the present invention uses a FH/TDD channel divided into time slots in a radio communications system including a transceiver which alternately transmits and receives. Each time slot makes use of a different frequency. The frequencies are selected according to a pseudo-random hop sequence. Physical links can be established by reservation of time slots spaced at a fixed interval. The information to be transferred from, for example, a sampled voice stream, may be divided into segments and compressed into packets with each packet being sent in a time slot belonging to the physical link. In case of heavy interference, a second link is established which conveys the same information as the first link, however delayed by a fixed delay. The extra link is requested by the unit that experiences quality problems in its receiver. After a negotiation phase between the units, the additional link is established. The unit receiving the two links receives the same information packet twice, but the corresponding packets will be received at different frequencies and at different times. As a result, both frequency diversity and time diversity are obtained which provide immunity against time-varying, band-limited interferers. The combining of the two packets can be done in different ways. The second link will result in a reduction of capacity of the system and should only be used for as long as the interferer is active. When the recipient experiences a good quality on both the links, one link can be released. Note that the extra link can be established for each direction separately: an extra link is set up only for the direction where the receiver experiences interference problems. If in a duplex link, both receivers are affected, an extra link in both directions may be set up. If after a while the interference vanishes, the extra link can be released to provide more capacity.

FH systems operating in the US in the 2.45 GHz band are required to use at least 75 hop frequencies. Recently, a standard has been developed by the IEEE (IEEE 802.11) for WLAN application. Both a FH version and a DS version have been defined. For the FH version, as is illustrated in FIG. 1, band 100, which represents the ISM band at 2.45 GHz, ranges from $f_L$ at around 2400 MHZ to $f_H$ at around 2483.5 MHZ and may be divided into 79 hop carriers $f_i$ 130 centered at frequencies spaced 1 MHZ apart from each other.

Figure 2:
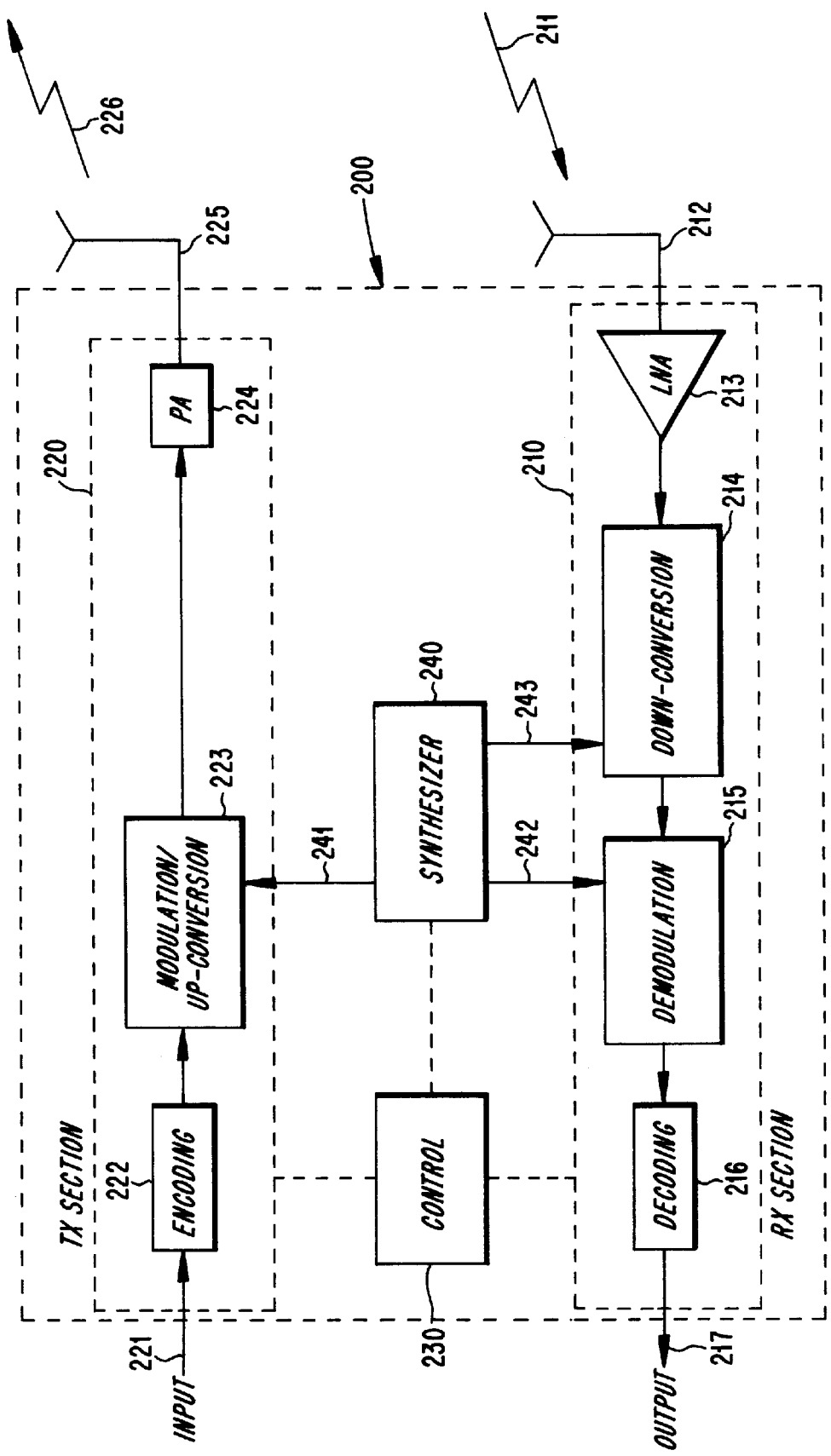
FIG. 2 is a diagram illustrating an exemplary FH radio transceiver configured to operate in the 2.45 GHz ISM band.

A general diagram for a radio transceiver suitable for use in a FH radio unit in accordance with the present invention is shown in FIG. 2. Transceiver 200 includes transmit section 210 and receive section 220 which may communicate with corresponding sections of another transceiver (not shown) using frequency hopping from one carrier to another carrier according to a pseudo-random hop pattern shared by all connected radio units. As long as all radio units are hop synchronized, that is hop according to the identical hop pattern employed, for example, in transceiver transmit and receive sections 210 and 220, they will simultaneously use the same carrier, and thus stay in contact. An input signal 221 may be encoded by an encoder 222 in transmitter section 220 and passed to modulation/up-conversion block 223 where further modulation, power spreading in accordance with FH methods, may be applied and the signal may be up converted to transmission frequency. The modulated and up converted signal may then be passed to power amplifier PA 224 for output through transmit antenna 225 as transmit signal 226 on the air interface. Receive signal 211 from a transmitter not shown may be received in receiver section 210 from the air interface through receive antenna 212 whereupon it is amplified in Low Noise Amplifier (LNA) 213. The modulated receive signal 211 is passed to down-converter 214 where it is converted back to base band and demodulated in demodulator 215. Both down-converter 214 and demodulator 215 are synchronized using frequency synthesizer 240 under the control of control unit 230. Synchronization may be maintained between transmitter section 220 and receiver section 210 of transceiver 200 and the corresponding transmit and receive sections of a transceiver not shown to accomplish frequency hopping.

Figure 3:
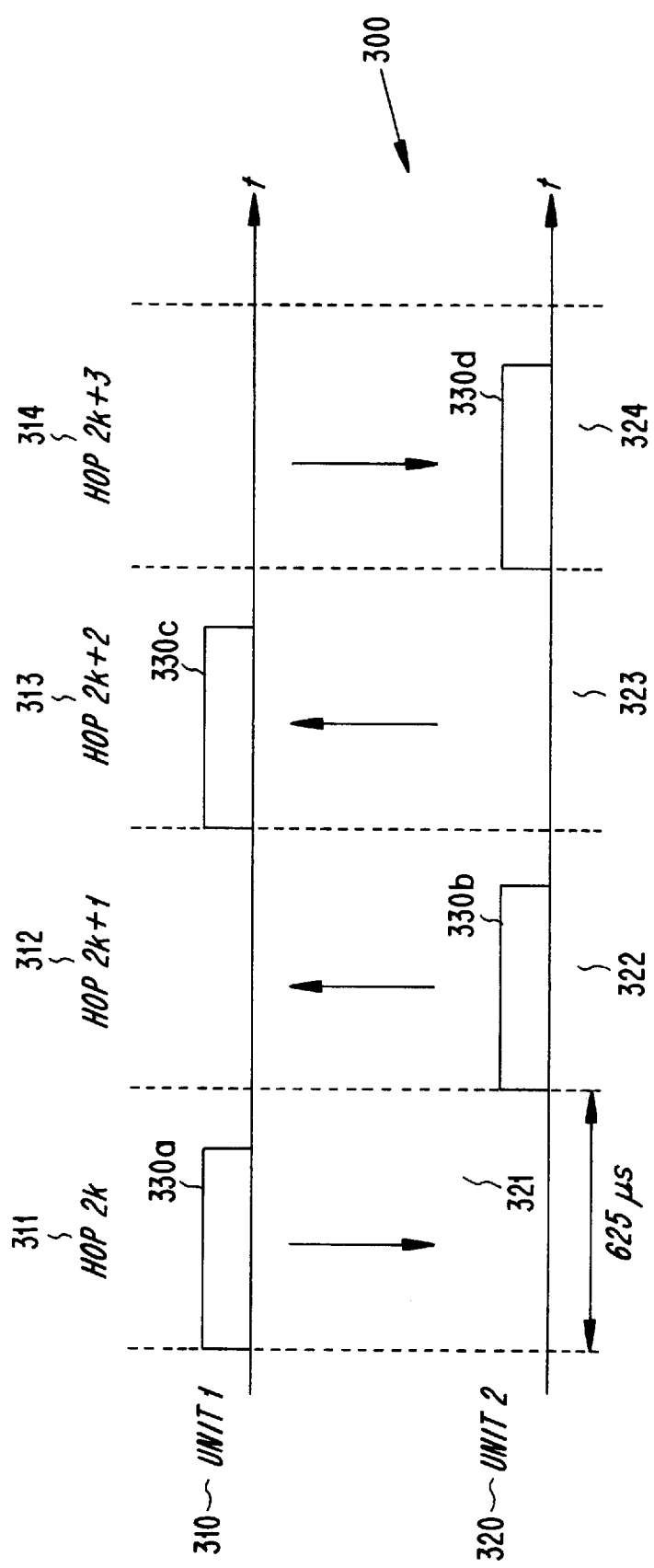
FIG. 3 is a diagram illustrating an exemplary FH/TDD channel in accordance with the present invention.

An FH system for ad-hoc connectivity between portable computing and communication devices like laptops, phones, headsets, and the like including a new air interface, as illustrated in FIG. 3, has been introduced. FH channels for each transmit/receive direction between two radio units are shown as Unit 1 channel 310 and Unit 2 channel 320. Channels 310 and 320 may be divided into time slots 321–324 where a single packet in a digital format may be sent or received. For example, in time slot 321, Unit 1 channel 310 may transmit packet 330a to Unit 2 channel 320. Packet 330a may be transmitted in time slot 321 at a first hop frequency 311. For time slots 322–324 different hop frequencies 312–314 are used. Hopping may proceed according to a hopping sequence which must be synchronized between Unit 1 and Unit 2. In order to obtain two-way communication, and as is further shown in FIG. 3, Unit 1 and Unit 2 may alternatively transmit and receive; that is, Unit 2 transmits, for example, on even-numbered time slots 312 and 314 and receives on odd-numbered time slots 311 and 313, whereas Unit 1 operates in exactly the opposite way as indicated. The result is two-way FH/TDD channel 300 where both frequency hopping (FH) and time division duplexing (TDD) are applied.

On such FH/TDD channels, circuit-switched links may be established to transmit synchronous, real-time information like voice (or video). However such data require a high degree of accuracy without sacrificing the real-time quality. Retransmission (ARQ) schemes that first test whether received data is correct and then trigger a retransmission of data upon errors, are not attractive because of the variable delay which may be introduced. A circuit-switched connection over FH/TDD channel 300 as illustrated in FIG. 3 can be established by reserving, slots spaced at fixed intervals as illustrated in FIG. 4A.

During a communication, information stream 480, which may be, for example, a voice stream, may be generated by sampling at a typical rate and generating data at a corresponding rate of 64 kbp/s, 56 kbp/s, or the like as is commonly used in the art. As information stream 480 is sampled, it is divided into segments, with each segment A 420, segment B 430 and segment C 440 being compressed into packets 422, 432, and 442 respectively and subsequently transmitted on time slots 401–419 at a rate of, for example, 1 Mbps. It can be seen that packets 422, 432, and 442 may further be placed in time slots 407, 413, and 419 respectively for transmission at intervals spaced apart by a predetermined number of time slots, for example, six time slots as shown. It should be noted that timeslots 401 through 419 may further be associated with FH hop intervals and may thus represent different hop frequencies. Reception of packets 422, 432, and 442 by a receiver unit may be accomplished by becoming FH synchronized according to a synchronization protocol that is established during the initial connection between communicating units.

Figure 4A:
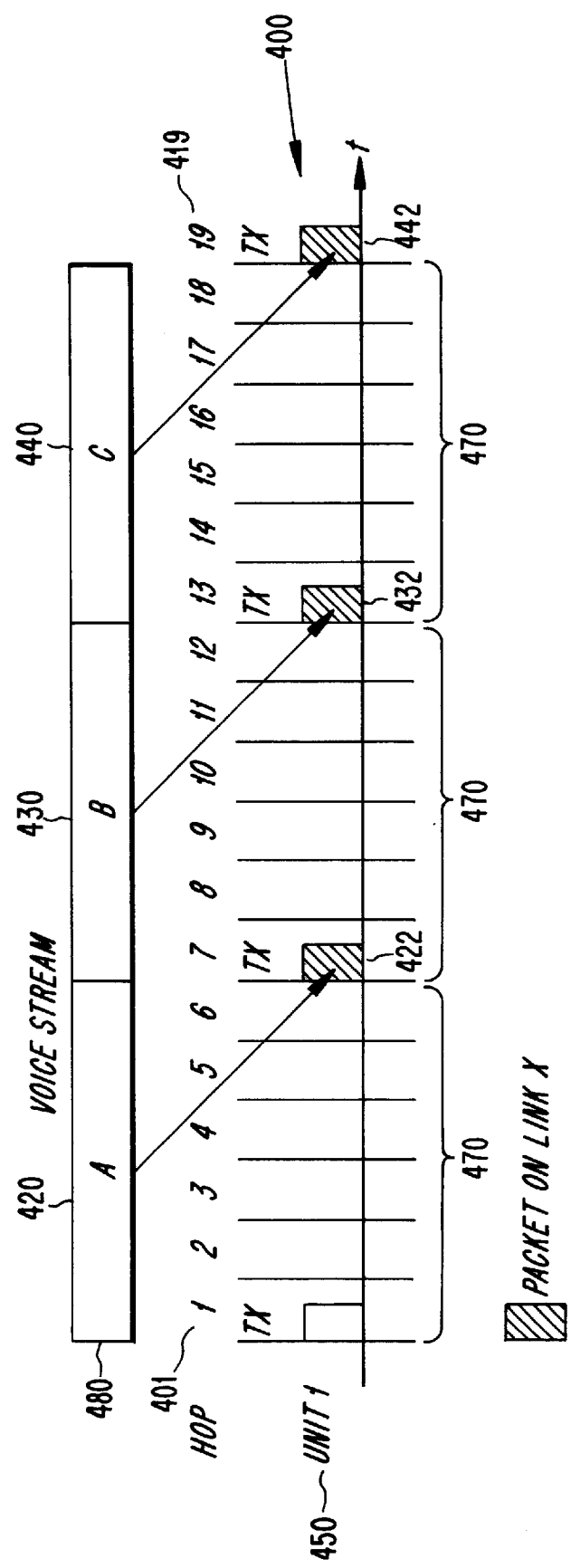
FIG. 4A is a diagram illustrating an exemplary physical link in accordance with the present invention.

The selection of interval 470, chosen to be, for example, an offset of six time slots in the exemplary embodiment illustrated in FIG. 4A, depends on the available capacity, the required capacity, and permitted delay for link 400 and may further be dependent to some extent on the nature of the underlying data in segments A 420, B 430, and C 440, (e.g., real-time data vs. NRT data, and the like). Information stream 480 on link 400, shown in the exemplary embodiment as a voice stream may be separated into segments A 420, B 430, and C 440 as described. Segment size may be such that each of segments A 420, B 430, and C 440 may compressed into packets 422, 432, and 442 respectively and fit into respective time slots 401–419 offset from each other by interval 470. When a time-varying interference source transmits signals characterized by exemplary energy curves 460 and 461, as illustrated in FIG. 4B, coincident with the frequency band and time slots occupied by data packets 422, 432, and 442 as illustrated in FIG. 4A, it may be noted that, for example, the transmission of packet 422 containing segment A 420 and packet 442 containing segment C 440 may be disturbed thus causing noticeable undesirable effects to the user (e.g. noise, or clicks), particularly with voice data.

Figure 5A:
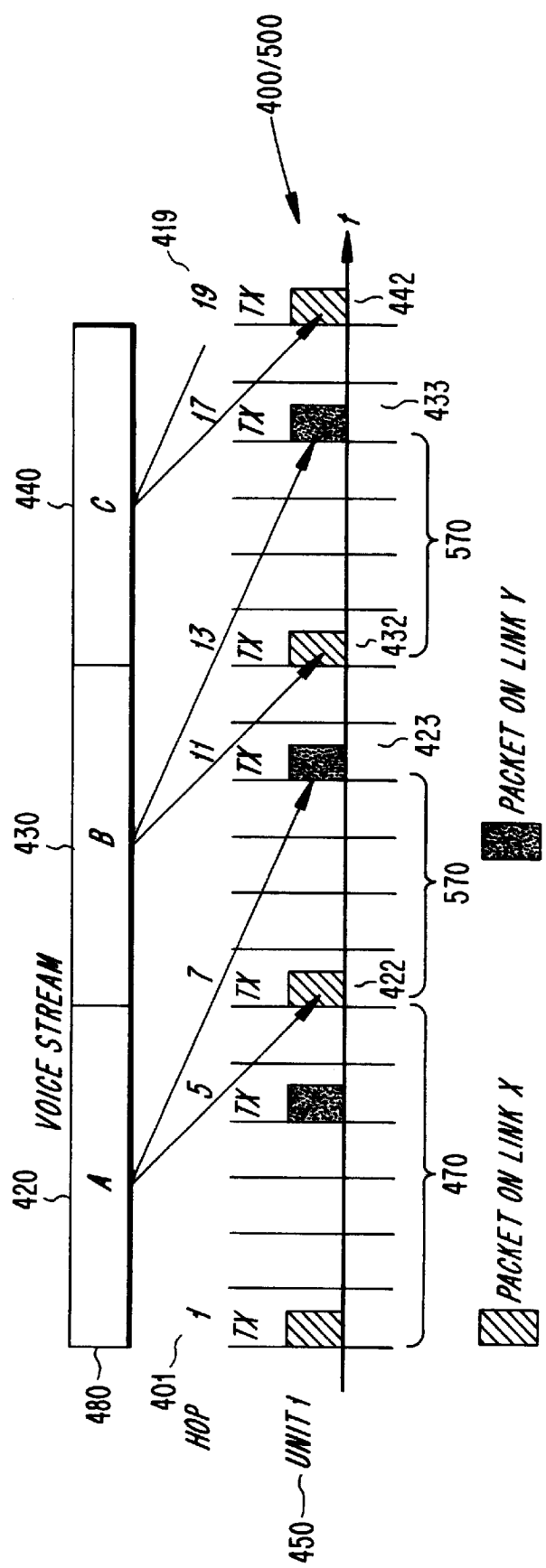
FIG. 5A is a diagram illustrating an exemplary voice stream being packaged for transmission over a first and second link in accordance with an embodiment the present invention.
Figure 5B:
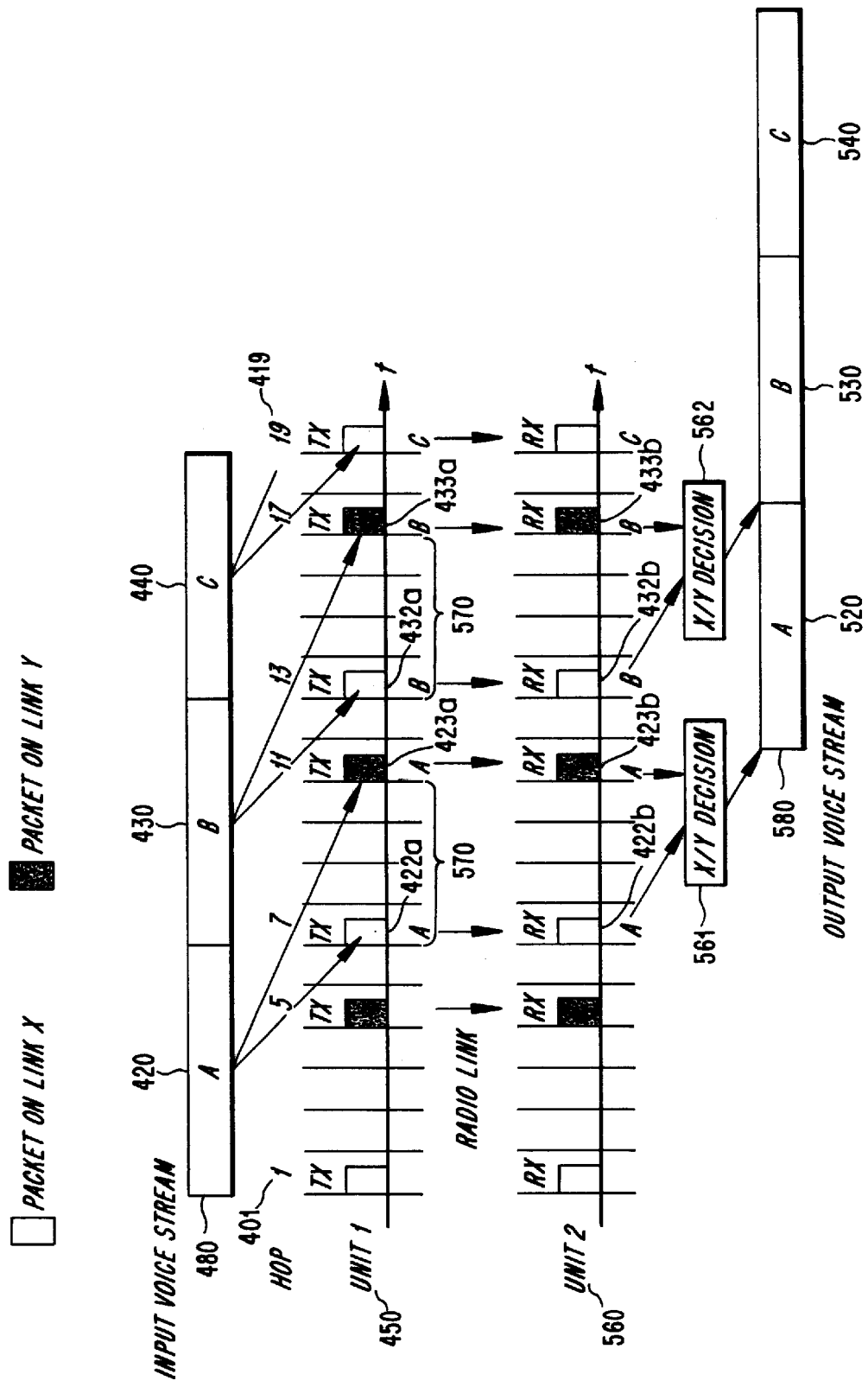
FIG. 5B is a diagram illustrating an exemplary first and second link in accordance with an embodiment the present invention.

In accordance with the present invention as illustrated in FIG. 5A, when interference energy emanating from a source characterized by exemplary energy curves 460 and 461 causes errors in data packets 422, 432, and 442, a second link may be established and may carry the same data from packets 422, 432, and 442, but may be delayed by, for example, four time slots as shown in FIG 5B. Accordingly, segment A 420, for example, is sent from unit 1 450 on time slot 407 and on time slot 411 as packets 422a and 423a respectively. Unit 2 560 may combine, for example, corresponding packets 422b and 423b at combination block 561, which may use one of several combination or discard decision strategies (e.g. based on quality measure and the like) enumerated in greater detail herein below. Similarly, segment B 430, for example, is sent from unit 1 450 on time slot 413 and on time slot 419 as packets 432a and 433a respectively. Unit 2 560 may combine, for example, corresponding packets B 432b and B 433b at combination block 562. Considering that, for example, either packet B 432b or B 433b may be corrupted, either packet may be considered redundant as to the other. Packet redundancy based on establishing a second link therefore may be used to reconstruct receive voice stream 580 by decompressing at unit 2 560, for example, segment A 520, segment B 530, and segment C 540 representing segment A 420, segment B 430, and segment C 440 respectively. Data packets such as 422b and 423b, and 432b, and 433b received at unit 2 560 from unit 1 450 may be combined in any one of a number of ways. For example, either one of data packets 422b or 423b representing segment A 420 may be discarded based on the failure of either one, or perhaps both, of the data packets to meet a quality measure. Exemplary measures may include RSSI, an interference measure based on BER or CRC failure, and the like. Redundant data packets 422b or 423b may also be combined at the symbol level, for example, before bit detection, using soft information to increase the likelihood of bit recovery. It is conceivable that a combination of approaches may be used for data packet combination particularly if a first combination approach fails. For example, if both data packets 422b land 423b representing segment A 420 each contain CRC errors, then it may be possible for the packets to be re-combined at the symbol level as a final attempt at recovery.

Figure 6:
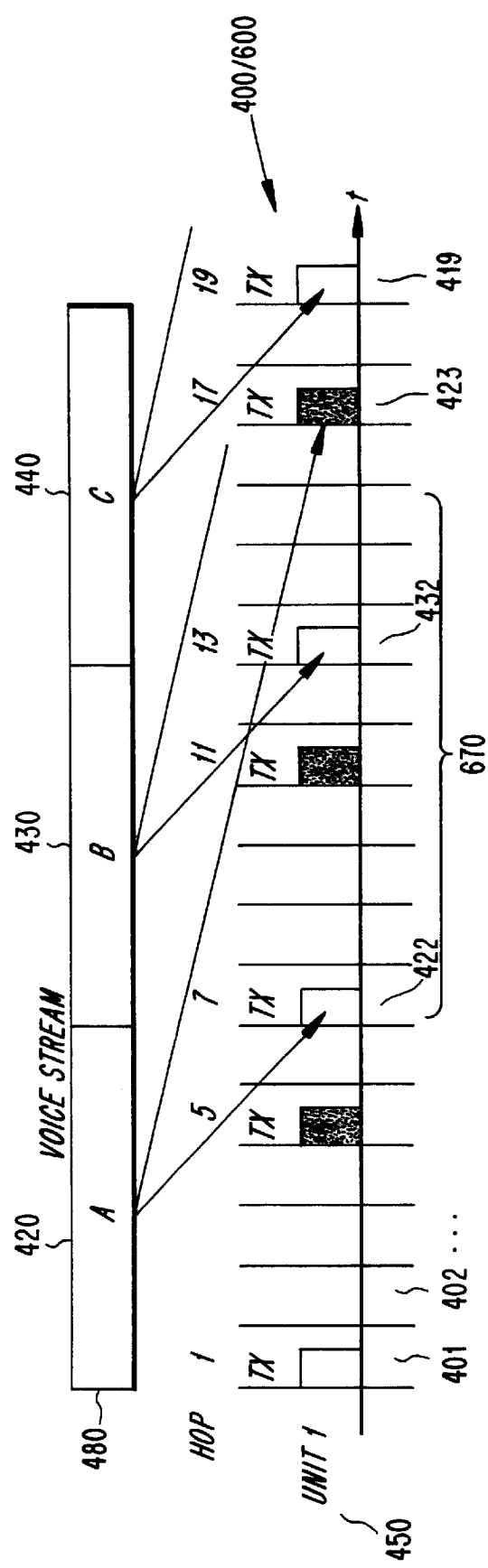
FIG. 6 is a diagram illustrating an exemplary first and second link in accordance with a further embodiment the present invention.

If interference energy from an interference source, as illustrated by energy curves 460 and 461 in FIG. 4B, follows a different time variation, that is, if energy curves 460 and 461, for example, shift in time, the time diversity established by, for example, fixed interval 470 may cease to provide effective interference avoidance. It may be necessary to delay the transmission of data packets on a second link by an even greater degree as exemplified by time interval 670 illustrated in FIG. 6. Data packet 422, 432, and 442 may be offset an additional amount, for example, by 10 slots in this exemplary embodiment. As is shown, data packet 422 may be packaged into time slot 407 and redundant data packet 423 may be packaged for transfer on time slot 417. In intervening time slot 413, packet 432 may be packaged and its redundant packet not being packaged until some slot beyond time slot 419 as shown. It will be understood that by increasing the delay period between redundant packets, as represented by interval 670, time diversity is further increased thus greatly enhancing the probability of avoiding interference from the time varying interference source. Further as a result of increased delay, unit 1 450 may be required to store more packets and wait longer before a decision can be made whether to combine data, discard data, or the like.

Figure 7:
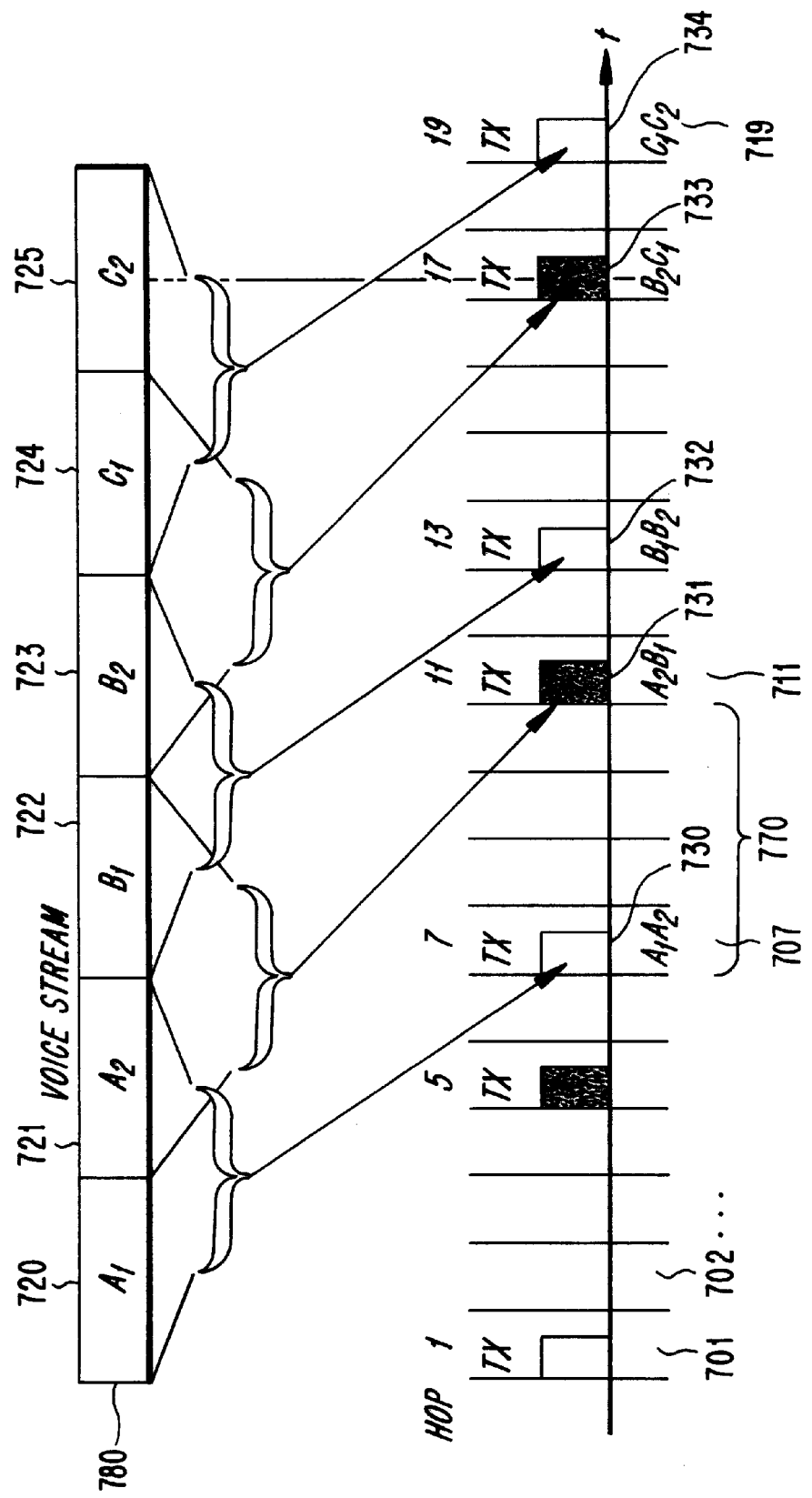
FIG. 7 is a diagram illustrating an exemplary first and second link in accordance with a still further embodiment the present invention.

In accordance with still another aspect of the invention, the delay interval associated with the additional (redundant) link can be supplemented by introducing a variable delay as packets associated with data stream 780 are compressed and placed on the first and second links as is illustrated in FIG. 7.

As in previous embodiments, delay interval 770 represents the difference in time between, for example, time slot 707 and time slot 711 associated with the first and second links respectively and, accordingly, the amount of time diversity desired to avoid time varying interference sources. It can be seen, however, that unlike previous embodiments, data packets 730 and 731 placed on first and second links respectively no longer correspond to the same portion of data stream 780. Rather, as illustrated, segment A, represented by segments $A_1$ 720 and $A_2$ 721 may be compressed and placed in time slot 707, associated with a first link, as data packet 730, while, after a period of delay, segment $A_2$ 721 and segment $B_1$ 722 may be compressed and placed in time slot 711, associated with a second link, as data packet 731. Accordingly, the contents of packets 730 and 731 are desynchronized in time. It should be noted that a delay may be added in the processing of segments of data stream 780 by delay elements, shift registers, and like means as are known in the art. It should further be noted that the contents of either the first or the second link may be shifted with respect to the other with the same results and that a corresponding compensation means such as a shift register, delay compensation element, and the like may be used by the receiver to re-synchronize data prior to combining.

In the present embodiment therefore, combining of received packets cannot be performed until the delay period is compensated for at the receiver and packet are then decompressed as in previous embodiments. It should be noted that decompression may be performed before or after the delay period is compensated for. Data from each link may then be combined to recreate the original data as represented by segments $A_1$ 720, $A_2$ 721, and so on. As in previous embodiments, soft information may be used to determine, for example for each bit pair, which bit to take or discard or how to combine information from each link. Soft information may include information accessible to a receiver which aids in detection and recovery of data from each link, such as CRC polynomials, coding related information, and the like.

As previously described, an additional link may be established if a receiving unit on either end of a transmission experiences a quality loss. In a further embodiment in accordance with the present invention, interference may be required to be experienced for a large number of packets before an additional link is established. It is further to be noted that the establishing of an additional link should not be made on a per-packet basis. Further, retransmission is not decided instantaneously per packet. Accordingly, since the present invention is not contemplated to adapt instantaneously to transient interference energy levels, an interference source must be active and causing packet degradation for a predetermined period of time or number of packets before an additional link is established. After the interference is experienced for the predetermined time period, Unit 1 450 and an associated transceiver may negotiate to establish a second link. Likewise, when packet quality on both links becomes acceptable for a predetermined time period or number of packets, the additional link may be released. It should be noted that the method and apparatus of the present invention provides an advantage of using existing air protocols as distinguished from prior art retransmission or time diversity techniques which do not.

It is contemplated that the teachings of the present invention in adding an additional link between transmitter and receiver to provide time diversity can be applied in any slot-based air interface standard. Therefore, the teachings of the present invention are not limited to the exemplary air interface described herein, but may also be applied in other standard TDMA systems like GSM or D-AMPS. Moreover, the present invention is not limited to one additional link. If required, a third, and fourth additional link and beyond may be introduced for as long as the interference source is active. The number of additional links may be limited by capacity and delay requirements and system resources. If a significant number of additional links are contemplated, it may further be required to add more buffering and processing capability in the receiver.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of communicating a plurality of data packets from a transmitter to a receiver in a radio communication system, comprising the steps of:

establishing a first radio link between the transmitter and the receiver, wherein the first radio link is one out of every n time slots, n>1;

establishing a second radio link between the transmitter and the receiver, wherein the second radio link is a different one out of every n time slots; and transmitting each of the plurality of data packets over both the first and second radio links, whereby the receiver receives each of the data packets twice, wherein each of the first and second radio links uses a frequency hopping channel and the first and second radio links are for exclusive use by the transmitter to transmit the plurality of data packets to the receiver, wherein for each of the plurality of data packets, transmission over the first radio link occurs on a different hop frequency than is used for transmission over the second radio link.

2. A method of communicating a plurality of data packets from a transmitter to a receiver in a radio communication system, comprising the steps of:

transmitting, by the transmitter, the plurality of data packets over a first radio link established between the transmitter and the receiver, wherein the first radio link is one out of every n time slots, n>1;

transmitting, by the transmitter, the plurality of data packets over a second radio link established between the transmitter and the receiver, wherein the second radio link is a different one out of every n time slots, wherein transmission over the first radio link occurs on a different hop frequency than the transmission over the second radio link and the first and second radio links are for exclusive use by the transmitter to transmit the plurality of data packets to the receiver.

3. The method of claim 1, wherein said second radio link is established at an offset of m time slots from said first link, where m>n.

4. The method of claim 1, wherein said second radio link is established at an offset of m time slots from said first link, where m<n.

5. The method of claim 1, wherein each of the first and second radio links uses a different frequency hopping sequence.

6. The method of claim 1, wherein the step of transmitting further includes the steps of:

delaying the plurality of data packets associated with one of the first or second radio links with respect to the other of the first or second radio links such that each of the plurality of data packets associated with both the first and the second links are desynchronized; and compensating for the delay in the receiver such that each of the plurality of data packets from both the first and the second radio links are re-synchronized.

7. The method of claim 1, wherein the second radio link is established in response to detection by the receiver of reception quality problems associated with the first radio link.

8. The method of claim 1, further comprising the step of terminating existence of one of the first or the second radio link in response to detection by the receiver of an absence of reception quality problems associated with the other of the first or the second radio link.

9. An apparatus for communicating a plurality of data packets from a transmitter to a receiver in a radio communication system, comprising:

means for transmitting, by the transmitter, the plurality of data packets over a first radio link established between the transmitter and the receiver, wherein the first radio link is one out of every n time slots, n>1;

means for transmitting, by the transmitter, the plurality of data packets over a second radio link established between the transmitter and the receiver, wherein the second radio link is a different one out of every n time slots, wherein transmission over the first radio link occurs on a different hop frequency than the transmission over the second radio link and the first and second radio links are for exclusive use by the transmitter to transmit the plurality of data packets to the receiver.

10. The apparatus of claim 9, wherein said means for establishing a second radio link is further configured to establish said second link at an offset of m time slots from said first radio link, where m>n.

11. The apparatus of claim 9, wherein said means for establishing a second radio link is further configured to establish said second link at an offset of m time slots from said first radio link, where m<n.

12. The apparatus of claim 9, wherein each of the first and second radio links uses a different frequency hopping sequence.

13. The apparatus of claim 9, wherein the means for transmitting further includes:

means for delaying the plurality of data packets associated with one of the first or second radio links with respect to the other of the first or second radio links such that each of the plurality of data packets associated with both the first and the second links are desynchronized; and means for compensating for the delay in the receiver such that each of the plurality of data packets from both the first and the second radio links are re-synchronized.

14. The apparatus of claim 9, wherein the means for establishing the second radio link operates in response to notification by the receiver of reception quality problems associated with the first radio link.

15. The apparatus of claim 9, further comprising means for terminating existence of one of the first or the second radio link in response to notification by the receiver of an absence of reception quality problems associated with the other of the first or the second radio link.

* * * * *

UNITED STATES PATENT AND TRADEMARK OFFICE
CERTIFICATE OF CORRECTION

PATENT NO. : 6,850,740 B1
DATED : February 1, 2005
INVENTOR(S) : Jacobus C. Haartsen It is certified that error appears in the above-identified patent and that said Letters Patent is hereby corrected as shown below:

Column 3,
Line 31, change "transmitter," to -- transmitter --
Line 55, change "plackets" to -- packets --

Column 7,
Line 50, change "land" to -- and --

Signed and Sealed this

Twenty-first Day of June, 2005

JON W. DUDAS
*Director of the United States Patent and Trademark Office*